Figure 1:
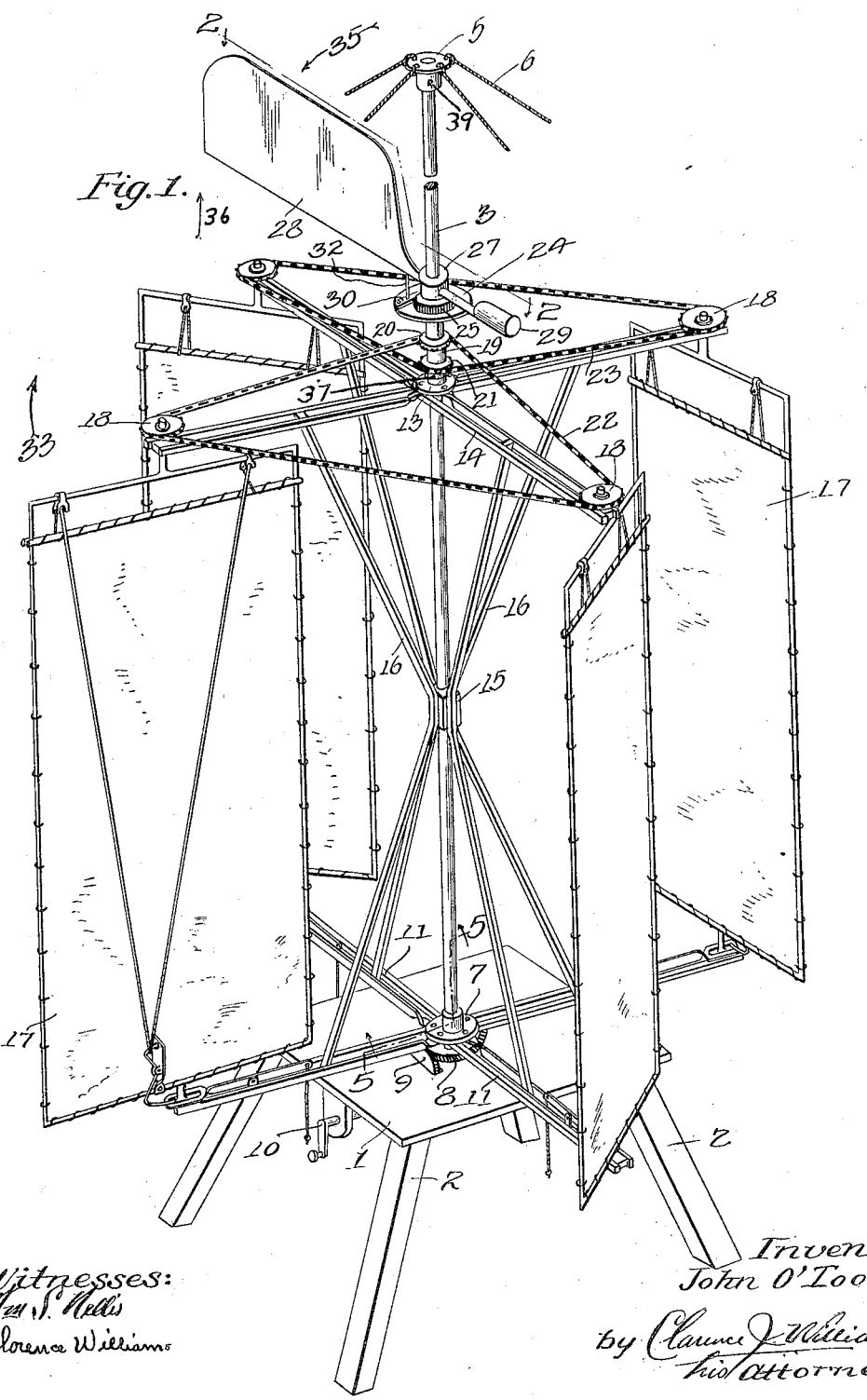

J. O'TOOLE.
WINDMILL.
APPLICATION FILED JUNE 10, 1912.

1,075,060.

Patented Oct. 7, 1913.
2 SHEETS—SHEET 1.

Witnesses:
Wm. S. Nellis
Florence Williams

Inventor
John O'Toole
by Clarence J. Williams
his Attorney.

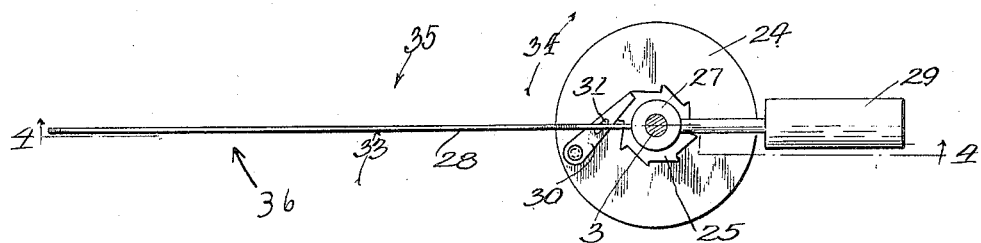
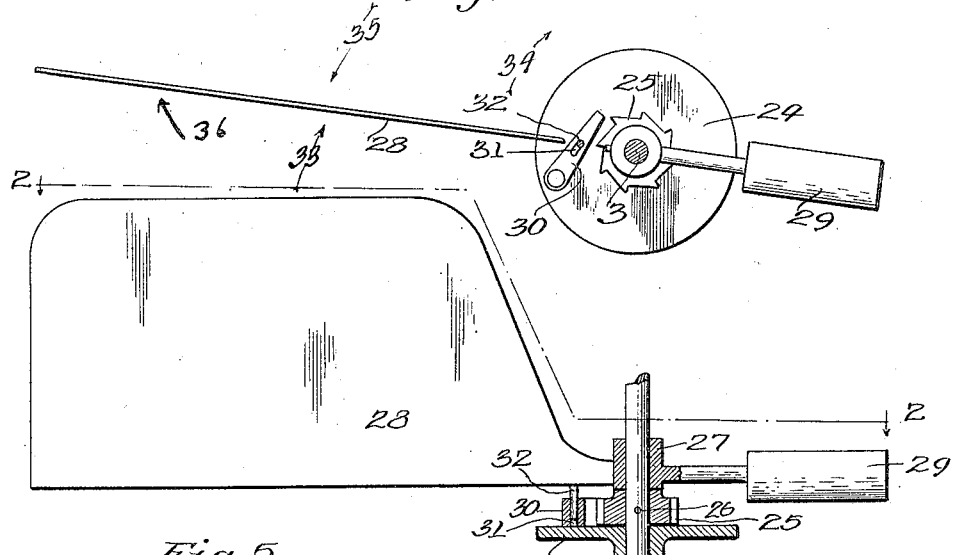
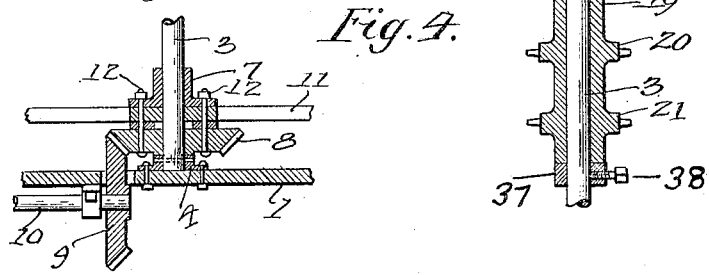

UNITED STATES PATENT OFFICE.

JOHN O'TOOLE, OF LOS ANGELES, CALIFORNIA.

WINDMILL.

1,075,060.　　　　　Specification of Letters Patent.　　　Patented Oct. 7, 1913.

Application filed June 10, 1912. Serial No. 702,654.

*To all whom it may concern:*

Be it known that I, JOHN O'TOOLE, a citizen of the United States, residing at Los Angeles, State of California, have invented a new and useful Improvement in Windmills, of which the following is a specification.

A windmill of this class, in case of variable winds, when the wind suddenly ceases, the momentum of the mill through the friction of the sprocket gears and chains will cause the tail vane to rotate with the mill, and the object of my invention is to provide means for automatically locking the tail vane against rotation. My invention is an improvement on my former invention, patented June 10th, 1912, and consists of the novel features herein shown, described and claimed.

In the drawings—Figure 1 is a perspective view of a feathering blade windmill embodying the principles of my invention. Fig. 2 is a horizontal sectional detail on the lines 2—2 of Figs. 1 and 4, and showing the vane locked. Fig. 3 is analogous to Fig. 2 and shows the vane unlocked. Fig. 4 is a vertical sectional detail on the line 4—4 of Fig. 2. Fig. 5 is a vertical sectional detail on the line 5—5 of Fig. 1.

Referring to the drawings in detail, the platform 1 is horizontally mounted upon the posts 2, forming a supporting frame. The main shaft 3 is fixed in the flange fitting 4 and the flange fitting is fastened to the platform, so as to hold the shaft in an upright position on the platform. The flange fitting 5 is fixed upon the upper end of the shaft 3 and is held rigid to the shaft by the pin 39. The guys 6 are fastened to the flange 5 and to suitable supports not shown, holding the shaft in a vertical position and against rotation.

The bearing 7 is rotatably mounted upon the shaft 3 and the bevel gear 8 is loosely mounted on the shaft and is bolted to the bearing 7. The bevel gear 9 is fixed upon the crank shaft 10 and extends through a slot in the platform and meshes with the gear 8.

The framework 11 is constructed to form four cross-arms and is mounted between the bearings 7 and the gear 8, and is held rigid and in a horizontal position by bolts 12. The bearing 13 is rotatably mounted upon the shaft 3. The frame 14 is fixed to the bearing 13, being constructed and extending horizontally, the same as frame 11. The bearing 15 is rotatably mounted half way between the bearings 7 and 13. The braces 16 rigidly connect the frames 11 and 14 with the bearing 15, thereby rigidly connecting the two frames together and making both frames into one.

The feathering blades 17 are rotatably mounted between the outer ends of the arms 11 and 14 of the frame. The sprocket gears 18 are fixed upon the upper ends of the spindles of the feathering blades and above the arms 14.

The sleeve 19 is loosely mounted upon the shaft 3 and rests on the collar 37 which is held in position on the shaft 3 by the setscrew 38. The sprockets 20 and 21 are fixed upon the lower end of the sleeve 19. The chains 22 and 23 connect the gears 18, and the sprocket gears 20 and 21, the chains passing around three gears each, one on the main shaft and two on the feathering blades. The flange 24 is horizontally fixed on the upper end of the sleeve 19 and forms a support for the pawl 30. The pawl wheel 25 is mounted upon the shaft 3 above the pawl support and is held rigid to the shaft by the pin 26. The hub 27 is loosely mounted upon the shaft 3 and rests on the pawl wheel 25. The tail vane 27 is fixed to and exends horizontally from the hub and the counter-balancing weight 29 extends in the opposite direction. The pawl 30 is pivoted to the outer edge of the pawl support 24 and extends inwardly to engage the teeth of the pawl wheel 25. The slot 31 is formed vertically through the center and extends lengthwise of the pawl 30. The pin 32 is rigidly connected to the tail vane 28 and extends downward into the slot 31, forming a connection between the tail vane 27 and the pawl support 24, the pawl support being rigidly connected with the sprockets 20 and 21 by the sleeve 19.

The sprocket wheels 18 are twice as large as the sprockets 20 and 21, so that while the mill makes one revolution the feathering blades make one-half of a revolution of their orbit. In construction the blades are set to feather relative to each other and to the tail vane and when the tail vane is pointing with the wind, the blades are feathered to catch the wind nearly the entire revolution, to turn the bevel gears 8 and 9 and the crank shaft 10, when the mill runs clockwise, as indicated by the arrows 33 in Figs. 1, 2 and 3, and the tendency is to rotate the sprocket gears 20 and 21 and the pawl support 24 in the same direction, as indicated by the arrows 34 in Figs. 2 and 3. When the pawl support starts to rotate, the tail vane through the pin 32 holds the center of the pawl against rotation, causing the inward end of the pawl to swing into engagement with the teeth of the pawl wheel 25. The pawl wheel being rigidly fixed to the stationary shaft 3, the pawl support is locked against rotation and stops the rotation of the sprocket wheels 20 and 21. When there is a change in the direction of the wind so as to strike the tail vane on the right hand side, as indicated by the arrows 35 in Figs. 1, 2 and 3, the tail vane swings with the wind and the pawl slides outwardly over the teeth of the pawl wheel until the tail vane again points with the wind. When the wind changes to the opposite direction, so as to strike the tail vane on the lefthand side, as indicated by the arrows 36 in Figs. 1, 2 and 3, the tail vane swings with the wind as shown in Fig. 3, causing the pin 32 to slide toward the inward end of the slot 31, drawing the pawl out of engagement with the pawl wheel and allowing the tail vane to swing until it points with the wind and comes to rest. Through this pawl and ratchet mechanism, the tail vane is automatically locked to the shaft under the rotation of the mill but is allowed to swing freely by the action of the wind. When the action of the wind swings the tail vane in either direction, the pin 32 slides to the end of the slot 31 and rotates the pawl support and the sprocket gears 20 and 21 in the same direction, thereby regulating the feathering of the blades to the direction of the wind.

The details of construction may be varied in many ways without departing from the spirit of my invention as set up in the following claims.

What I claim is—

1. A wind mill having a stationary shaft, a rotating frame, feathering wind blades and a tail vane; and means whereby the tail vane is automatically locked to the shaft under the action of the rotating frame and wind blades and automatically unlocked by the action of the wind.

2. A wind mill having a supporting frame, a non-rotatable shaft mounted upon the supporting frame, a rotatable frame mounted upon the shaft, feathering wind blades mounted in the rotatable frame, a tail vane for adjusting the feathering of the wind blades, and a ratchet mechanism for locking the tail vane to the shaft under the action of the rotatable frame and allowing the tail vane to rotate by the action of the wind so as to adjust the feathering of the wind blades to the direction of the wind.

3. In a wind mill, a supporting frame, a stationary shaft mounted upon the supporting frame; guys holding the shaft vertical and against rotation, a frame rotatably mounted upon the shaft, a crank shaft mounted upon the supporting frame and connected by bevel gears to the rotatable frame, feathering blades mounted in the rotatable frame, sprocket gears mounted upon the spindles of the feathering blades, chains connecting the sprocket gears, a pawl wheel fixed upon the shaft, a pawl carried by the shaft sprocket gears and in position to engage the teeth of the pawl wheel, a tail vane rotatably mounted upon the shaft and a connection between the tail vane and the pawl, forming a means whereby the tail vane is automatically locked to the shaft by means of the pawl under the action of the mill, and a means whereby the pawl is thrown out of engagement with the pawl wheel and the tail vane is automatically unlocked from the shaft by the action of the wind.

4. In a wind mill having a main shaft, a rotatable frame, feathering wind blades and a tail vane, and means whereby the tail vane is locked against rotation by the action of the mill and unlocked by the action of the wind.

JOHN O'TOOLE.

Witnesses:
CLARENCE J. WILLIAMS,
A. S. MAYNARD.

---

Copies of this patent may be obtained for five cents each, by addressing the "Commissioner of Patents, Washington, D. C."